No. 654,300. Patented July 24, 1900.
H. W. ADAMS, Jr.
INFLATION VALVE SUPPORT.
(Application filed Apr. 2, 1900.)
(No Model.)
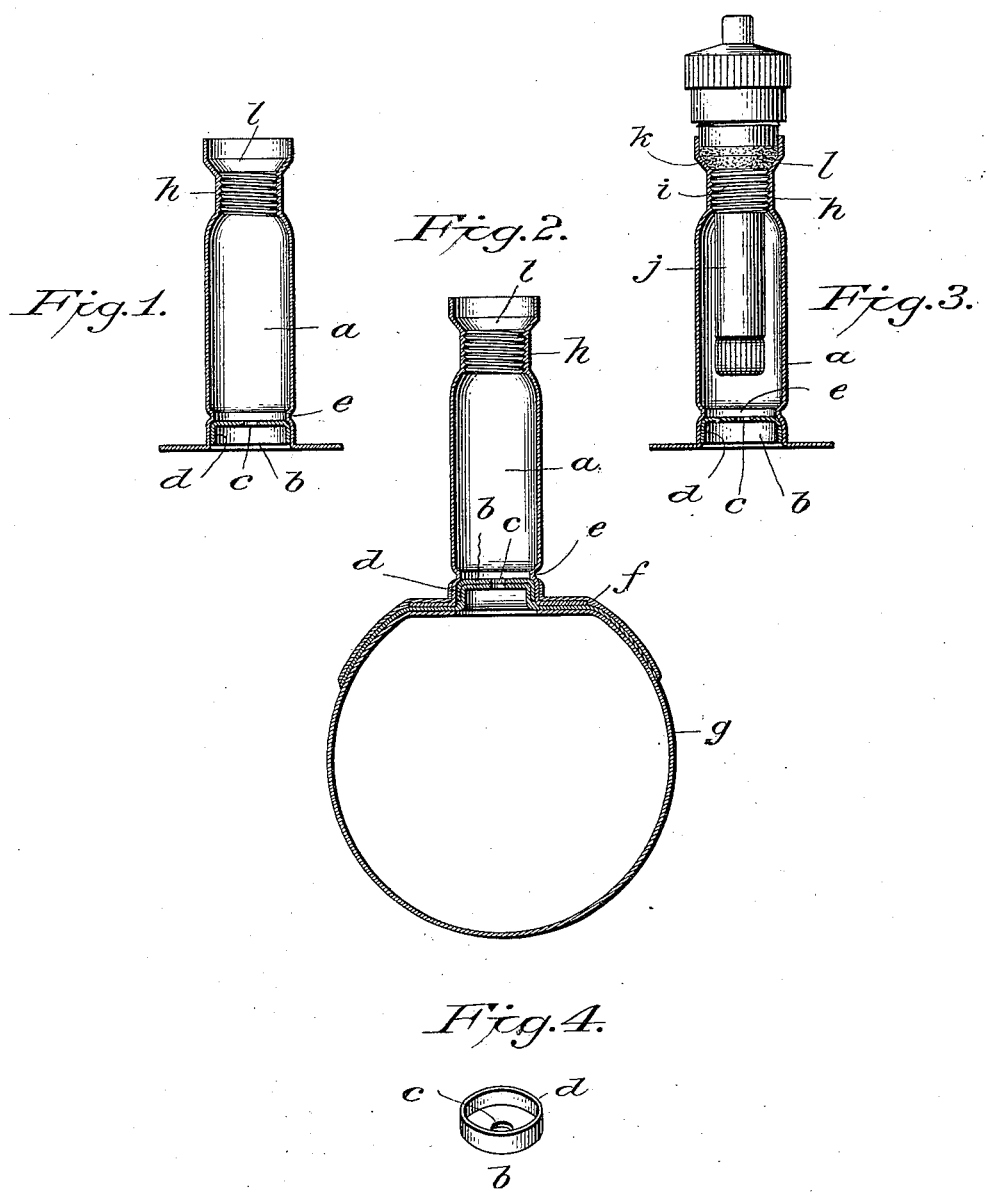

UNITED STATES PATENT OFFICE.

HENRY WILLIAM ADAMS, JR., OF ELGIN, ILLINOIS, ASSIGNOR TO THE SCOVILL MANUFACTURING COMPANY, OF WATERBURY, CONNECTICUT.

INFLATION-VALVE SUPPORT.

SPECIFICATION forming part of Letters Patent No. 654,300, dated July 24, 1900.

Application filed April 2, 1900. Serial No. 11,145. (No model.)

*To all whom it may concern:*

Be it known that I, HENRY WILLIAM ADAMS, Jr., a citizen of the United States, residing at Elgin, in the county of Kane and State of Illinois, have invented a certain new and useful Improvement in Inflation-Valve Supports, of which the following is a full, clear, and exact description.

This invention relates to a support for receiving a valve, and especially to such a support for attaching inflation-valves to the pneumatic tires of bicycle and other wheels and objects; and the invention consists of a tube in which the valve is supported by its casing, the inner end of said tube being provided with a bushing to exclude foreign substances from entrance into said tube during the process of applying the tube to the article upon which it is to be used. In the case of the application of the tube to a pneumatic tire for wheels by means of a cot the said bushing serves to exclude from the tube the rubber in vulcanizing the same in place, and thus prevents the obstruction of said tube and interference with the valve, all as I will proceed now more particularly to set forth and finally claim.

In the accompanying drawings, illustrating my invention, in the several figures of which like parts are similarly designated, Figure 1 is a longitudinal section of the bushed supporting-tube. Fig. 2 is a cross-section illustrating the application of my invention to the inflation-tube of a wheel-tire. Fig. 3 is a longitudinal section of the bushed tube containing one form of inflation-valve. Fig. 4 is a perspective view of the bushing detached.

In the patent of John H. and Edward O. Goss, assignors to the Scovill Manufacturing Company, No. 632,218, dated August 29, 1899, provision is made for supporting such a valve as that herein shown by its casing in a tube specially provided for that purpose, and which tube is wholly independent in construction and operation from the valve and its casing, whereby the valve as a whole may be removed bodily from the supporting-tube at pleasure without in any manner whatever disturbing the connection of the supporting-tube with the tire. It has been found in the application of the supporting-tube to the tire by vulcanization of some portion of the tire about said tube that the soft rubber is liable to enter the inner end of the tube and obstruct the tube and interfere with the operation of the valve. In order to obviate this difficulty, I use a supporting-tube $a$ and close its inner end by a bushing $b$, which has a small central air-duct $c$. This bushing may be a disk of metal having, as stated, the central opening $c$ and the cylindrical flange $d$, so that the bushing may be put in position in the inner end of the tube $a$ by forcing it therein, with or without the aid of other fastenings. I prefer, however, to provide a circumferential inwardly-projecting bead $e$ in the tube $a$ to limit the inward projection within the tube of the said bushing. Obviously the provision of the bushing $b$ is sufficient to exclude from the interior of the tube the rubber used in vulcanizing the cot to it, and thus the interior of the tube is left free to receive the valve-casing. As will be seen by reference to Fig. 3, the tube $a$ has its bottom flange embedded and vulcanized in a rubber cot $f$ of any number of thicknesses and of any desired construction, and this cot is afterward cemented or otherwise applied to the air-tube $g$. During the process of embedding the tube $a$ in the cot the opening $c$ in the bushing may be preserved by closing it with a removable plug or pin, and such plug or pin may be part of the vulcanizing mold. I do not limit my invention, however, to this one way of assembling the bushed tube on an object to be inflated.

As herein shown, the tube $a$ is provided with a contracted neck $h$, which is internally screw-threaded to engage an external screw-thread $i$ on the valve-casing $j$ to support the valve-casing within said tube, and an airtight joint may be insured by the provision of a washer or packing $k$ to be seated in a socket $l$ at the outer end of the tube, as in one of the forms of the invention of the Patent No. 632,218, hereinbefore referred to. However, I do not limit my invention to this last-mentioned construction.

The bushing $b$ may be of other forms or constructions than that shown so long as it serves to protect the tube $a$ from the undesirable entrance of foreign matter.

What I claim is—

1. A tube for supporting an inflation-valve in position, said tube being made independent of the inflation-valve and removably receiving said inflation-valve by the casing of the latter, and having a bushing inserted in its inner end and adapted to exclude foreign substances from the interior of the said tube during the process of vulcanizing the tube to an object, substantially as described.

2. A supporting-tube, for removably receiving an inflation-valve, made wholly independent of the said inflation-valve, having its inner end provided with a bushing, and a circumferential inwardly-projecting bead next adjacent to and limiting the inward projection of said bushing, substantially as described.

In testimony whereof I have hereunto set my hand this 29th day of March, A. D. 1900.

HENRY WILLIAM ADAMS, Jr.

Witnesses:
GEORGE B. KERR,
GEO. T. POWER.